(12) United States Patent
Breitzmann et al.

(10) Patent No.: US 9,041,327 B2
(45) Date of Patent: May 26, 2015

(54) METHOD AND APPARATUS FOR OVERVOLTAGE PROTECTION AND REVERSE MOTOR SPEED CONTROL FOR MOTOR DRIVE POWER LOSS EVENTS

(71) Applicants: Robert J. Breitzmann, South Russell, OH (US); Semyon Royak, Orange Village, OH (US); John M. Kasunich, Mayfield Heights, OH (US)

(72) Inventors: Robert J. Breitzmann, South Russell, OH (US); Semyon Royak, Orange Village, OH (US); John M. Kasunich, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 169 days.

(21) Appl. No.: 13/915,647

(22) Filed: Jun. 12, 2013

(65) Prior Publication Data

US 2014/0368143 A1    Dec. 18, 2014

(51) Int. Cl.
*H02P 3/22* (2006.01)
*H02P 29/02* (2006.01)
*H02M 1/32* (2007.01)
*H02M 7/5387* (2007.01)
*H02M 5/458* (2006.01)

(52) U.S. Cl.
CPC .............. *H02P 3/22* (2013.01); *H02P 29/024* (2013.01); *H02M 1/32* (2013.01); *H02M 5/458* (2013.01); *H02M 7/5387* (2013.01)

(58) Field of Classification Search
CPC ........ H02M 1/32; H02M 5/458; H02P 29/024
USPC .................. 318/400.22, 380; 363/95, 98, 131
See application file for complete search history.

(56) References Cited

U.S. PATENT DOCUMENTS

| 3,757,197 A | 9/1973 | Bailey |
| 4,039,914 A | 8/1977 | Steigerwald et al. |
| 4,215,304 A | 7/1980 | D'Atre et al. |
| 4,230,979 A | 10/1980 | Espelage et al. |
| 4,276,589 A | 6/1981 | Okawa et al. |
| 4,308,491 A | 12/1981 | Joyner, Jr. et al. |
| 4,496,899 A | 1/1985 | Lippitt et al. |
| 4,545,002 A | 10/1985 | Walker |
| 4,761,600 A | 8/1988 | D'Atre et al. |
| 4,833,389 A | 5/1989 | Kovalk |
| 4,870,338 A | 9/1989 | Abbondanti |
| 4,958,119 A | 9/1990 | Fitzner |
| 5,005,115 A | 4/1991 | Schauder |

(Continued)

FOREIGN PATENT DOCUMENTS

| EP | 1936796 A1 | 6/2008 |
| JP | 2002345258 A | 11/2002 |
| WO | WO2011/129705 A1 | 10/2011 |

OTHER PUBLICATIONS

European Search Report, EP14167749.2-1809, Mailed Nov. 24, 2014, Completed Nov. 12, 2014, The Hague, 10 pgs.

(Continued)

*Primary Examiner* — Karen Masih
(74) *Attorney, Agent, or Firm* — Fay Sharpe LLP

(57) ABSTRACT

Apparatus and methods are presented for mitigating overvoltages and limiting reverse motor speeds for motor drive power loss events, in which a first power dissipation circuit is enabled at the motor drive output to limit reverse rotation of a driven motor load when motor drive power is lost, and a second power dissipation circuit in a DC bus circuit is used to mitigate over voltages following restoration of motor drive power.

20 Claims, 3 Drawing Sheets

(56) References Cited

U.S. PATENT DOCUMENTS

| | | |
|---|---|---|
| 5,041,959 A | 8/1991 | Walker |
| 5,083,039 A | 1/1992 | Richardson et al. |
| 5,715,154 A | 2/1998 | Rault |
| 5,798,632 A | 8/1998 | Muljadi |
| 5,933,339 A | 8/1999 | Duba et al. |
| 5,969,957 A | 10/1999 | Divan et al. |
| 6,118,676 A | 9/2000 | Divan et al. |
| 6,157,097 A | 12/2000 | Hirose et al. |
| 6,166,513 A | 12/2000 | Hammond |
| 6,166,929 A | 12/2000 | Ma et al. |
| 6,229,722 B1 | 5/2001 | Ichikawa et al. |
| 6,262,555 B1 | 7/2001 | Hammond et al. |
| 6,288,508 B1 | 9/2001 | Taketomi et al. |
| 6,301,130 B1 | 10/2001 | Aiello et al. |
| 6,377,478 B1 | 4/2002 | Morishita |
| 6,417,644 B2 | 7/2002 | Hammond et al. |
| 6,577,483 B1 | 6/2003 | Steicher et al. |
| 6,646,842 B2 | 11/2003 | Pan et al. |
| 6,653,806 B1 | 11/2003 | Ono |
| 7,158,393 B2 | 1/2007 | Schneider |
| 7,233,465 B2 | 6/2007 | Lee |
| 7,312,537 B1 | 12/2007 | Walling |
| 7,432,686 B2 | 10/2008 | Erdman et al. |
| 7,462,946 B2 | 12/2008 | Wobben |
| 7,479,756 B2 | 1/2009 | Kasunich et al. |
| 7,505,291 B2 | 3/2009 | Wang et al. |
| 7,508,147 B2 | 3/2009 | Rastogi et al. |
| 7,511,385 B2 | 3/2009 | Jones et al. |
| 7,511,975 B2 | 3/2009 | Hammond |
| 7,595,563 B2 | 9/2009 | Wobben |
| 7,656,052 B2 | 2/2010 | Jones et al. |
| 7,663,260 B2 | 2/2010 | Kabatzke et al. |
| 7,679,208 B1 | 3/2010 | Ko et al. |
| 7,692,321 B2 | 4/2010 | Jones et al. |
| 7,692,325 B2 | 4/2010 | Ichinose et al. |
| 7,755,209 B2 | 7/2010 | Jones et al. |
| 7,816,798 B2 | 10/2010 | Hehenberger |
| 7,880,343 B2 | 2/2011 | Kleinecke et al. |
| 7,929,323 B2 | 4/2011 | Schmidt |
| 7,965,529 B2 | 6/2011 | Gibbs et al. |
| 8,030,791 B2 | 10/2011 | Lang et al. |
| 8,223,515 B2 | 7/2012 | Abolhassani et al. |
| 8,400,085 B2 | 3/2013 | Rinch et al. |
| 2002/0191426 A1 | 12/2002 | Hussein et al. |
| 2003/0035311 A1 | 2/2003 | Phadke |
| 2004/0239272 A1 | 12/2004 | Schulz et al. |
| 2006/0232250 A1 | 10/2006 | Sihler et al. |
| 2007/0159866 A1* | 7/2007 | Siri .................................. 363/95 |
| 2008/0074812 A1 | 3/2008 | Oestreich et al. |
| 2009/0224705 A1 | 9/2009 | Jobard et al. |
| 2011/0057444 A1 | 3/2011 | Dai et al. |
| 2011/0057588 A1 | 3/2011 | Rineh et al. |

OTHER PUBLICATIONS

U.S. Appl. No. 13/858,187, filed Apr. 8, 2013, entitled "Power Stage Precharging and Dynamic Braking Apparatus for Multilevel Inverter" by Liu et al.

* cited by examiner

METHOD AND APPARATUS FOR OVERVOLTAGE PROTECTION AND REVERSE MOTOR SPEED CONTROL FOR MOTOR DRIVE POWER LOSS EVENTS

BACKGROUND

Motor drives are power conversion systems used to provide power to a driven electric motor by converting received input power. The motor load, in turn, may be used in a variety of different applications. In submersible well pumps, a driven pump motor is used to drive a screw or centrifugal type pump, typically to extract fluid from a well. In normal operation, the pump motor turns in a forward direction to pump the fluid upward within the well tube. If the associated motor drive loses power, however, the pump motor will stop rotating, and previously pumped fluid will start draining back down into the well, causing the rotor of the pump motor to spin in the reverse direction. If the motor is constructed with permanent magnets, the reverse rotation of the pump motor creates a back EMF which may lead to significant voltage that can damage the motor and/or degrade components in the motor drive, including a DC bus capacitor at the input of the drive inverter. Screw type pumps in particular can accelerate in the reverse direction to a point where the back EMF creates a significant voltage that is greater than the nominal voltage of the motor. Moreover, reverse rotation of the pump motor allows fluid to drain back down into the well, whereby the pumping work that was done prior to power loss must be redone later when power is restored. A similar situation occurs in motor driven cranes, in which the load on a crane motor may tend to reverse the motor rotation during power loss events. Accordingly, a need remains for techniques and apparatus to protect motor drives and driven motors from damage due to excess back EMF, and to prevent the motor from reaching high reverse speeds for power loss situations.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. Techniques, systems, and apparatus are disclosed for power conversion in which reverse motor load rotation is controlled or limited by enabling an output dissipation circuit following loss of system input power, and DC bus overvoltages are mitigated by activating a second dissipation circuit after system input power is reinstated. The disclosed concepts can be advantageously employed in pump motor power conversion systems, motor driven crane systems, and other applications in which it is desirable to control unpowered reverse motor rotation and to mitigate the effects of associated back EMF to protect the power conversion system and/or a driven motor.

In accordance with one or more aspects of the present disclosure, a power conversion system is provided which includes a DC bus circuit, an inverter and a controller, as well as first and second power dissipation circuits. The first power dissipation circuit is coupled with the system AC output and selectively couples one or more resistive loads between two or more of the AC output terminals to dissipate regenerative power provided to the system from a driven load. The second power dissipation circuit is operable to selectively dissipate power in the DC bus circuit. In certain embodiments, the controller responds to loss of system input power to provide a control signal to activate the first power dissipation circuit in order to dissipate power provided to the AC output from the load. In this manner, reverse motor rotational speed can be limited, thereby reducing the amount of pumping or lifting work previously done in submersible pump and/or crane applications. The controller may also selectively disable operation of the output inverter in response to loss of system power.

After input power is restored, the controller in certain embodiments deactivates the first power dissipation circuit, resumes switching operation of the inverter, and activates the second power dissipation circuit to selectively dissipate power in the DC bus circuit. By this operation, the potential adverse effects of excess DC bus voltage can be avoided or mitigated to protect the DC bus capacitance and other power conversion system components. Certain embodiments of the system may include an output filter connected between the inverter and the system AC output, with the first power dissipation circuit connected to two or more AC output terminals following the filter. In certain implementations, the first power dissipation circuit includes a rectifier as well as a switch and a resistor, and the switch may be activated by a control signal from the conversion system controller in certain embodiments to selectively connect the resistor across the output of the rectifier for dissipating regenerative power. In other possible implementations, a contactor or other type of switch can be used to connect one or more resistors across two or more of the output leads to dissipate regenerative power. The first power dissipation circuit, moreover, can be integral to a motor drive type power converter, or can be separately connected between a motor drive AC output and a driven load in a power conversion system.

A method and computer readable medium with computer executable instructions are provided in accordance with further aspects of the disclosure for mitigating motor drive overvoltage and limiting reverse rotation of a motor load for motor drive power loss events. The method involves disabling operation of the motor drive output inverter and selectively coupling a first resistive load circuit to two or more AC nodes between the inverter and the motor load in response to loss of motor drive system input power in order to limit reverse rotation of the motor load by dissipation of power provided to the motor drive from the motor load. The method further includes selectively disabling the first resistive load circuit and selectively enabling inverter operation to drive the motor load to resume rotation in a forward direction after restoration of motor drive system input power, as well as selectively connecting a second resistor load to dissipate power in a motor drive DC bus circuit. In certain implementations, the second resistive load is thereafter disconnected to resume normal motor drive operation. The selective operation of the first and second resistive loads involves provision of associated control signals from a motor drive controller in certain embodiments. In certain implementations, moreover, operation of the motor drive output inverter is disabled prior to connection of the first resistive load circuit.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
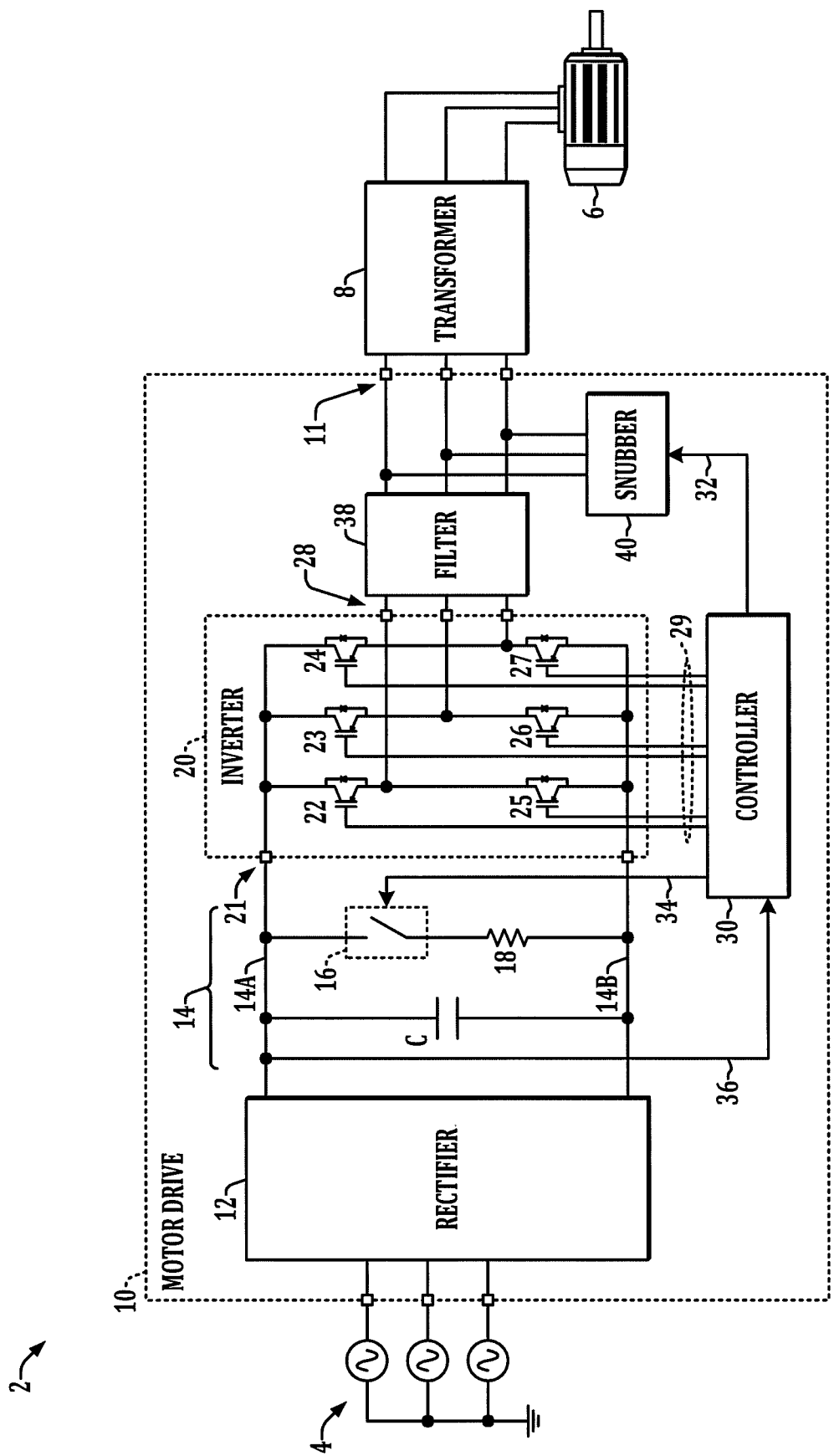
FIG. 1 is a schematic diagram illustrating an exemplary power conversion system for driving a motor load, including first and second power dissipation circuits operated according to control signals from a motor drive controller in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale.

FIG. 1 shows an exemplary power system 2 including an AC input source 4 and a motor drive 10 with an AC output 11 providing power through an optional transformer 8 to drive a motor load 6. The motor drive 10 includes a rectifier 12, which can be an active (e.g., switching) rectifier and/or may be a passive rectifier with one or more switches and/or diodes that receive three-phase AC input power from the source 4 and provide a DC bus voltage to a DC bus circuit 14 for use by an output inverter 20. The DC bus circuit 14 includes a DC capacitance C, which can be a single capacitor component or multiple capacitors connected it in any suitable series, parallel and/or series/parallel configuration to provide a capacitance between upper and lower DC circuit branches 14A and 14B, respectively. In addition, as discussed further below, a DC bus snubber circuit is included in the bus circuit 14, having a switching device 16 connected in series with a load resistance 18 between the upper and lower DC circuit branches 14A and 14B of the bus circuit 14. The DC bus circuit 14 provides a DC voltage as an input to the inverter 20 at first and second DC input terminals 21, and the inverter selectively connects the DC input terminals 21 with three AC output terminals of an AC output 28 using inverter switching devices 22, 23, 24, 25, 26 and 27 operated according to pulse width modulated switching control signals 29 from a motor drive controller 30.

The controller 30 can be implemented using any suitable hardware, processor executed software or firmware, or combinations thereof, wherein an exemplary embodiment of the controller 30 includes one or more processing elements such as microprocessors, microcontrollers, FPGAs, DSPs, programmable logic, etc., along with electronic memory, program memory and signal conditioning driver circuitry, with the processing element(s) programmed or otherwise configured to generate the inverter switching control signals 29 suitable for operating the switching devices of the inverter 20, as well as to perform other motor drive operational tasks to drive a load. Moreover, computer readable mediums are contemplated with computer executable instructions for implementing the described power converter switching control processes and techniques, which may be stored as program instructions in an electronic memory forming a part of, or otherwise operatively associated with, the controller 30. The controller 30 also provides a switching control signal 34 to selectively actuate the DC bus snubber switch 16, and receives one or more feedback signals including a DC bus voltage feedback signal 36 indicating the voltage in the DC bus circuit 14.

The inverter output 28 is connected to ultimately drive the motor load 6, either directly or through one or more intervening circuits. In the illustrated embodiment, for example, an output filter 38 is connected between the inverter output 28 and the AC output terminals of the motor drive AC output 11, and an external step up transformer 8 is connected between the motor drive output 11 and the motor load 6. The output filter 38 in certain embodiments may be an LC filter, an LCL filter, or any other suitable form of a filter circuit configuration, and may be physically separate from the drive 10 or may be integrated therein. The transformer 8 may be an external device as shown, or may be integrated within the motor drive 10 in certain embodiments, and may have any suitable turns ratio, such as a step up transformer in one implementation. A step up transformer may be useful in a submersible pump application in which it is desirable to provide high voltage signals to the motor load 6 in order to mitigate $I^2R$ losses along a lengthy cable run between the transformer 8 and the motor load 6. A step up transformer 8 may also be used to match the output of a medium or low voltage motor drive 10 with a motor load 6 of a higher voltage rating, or to otherwise match the drive 10 with the motor 6 in consideration of potentially high voltage drops across a long cable run. In other embodiments, the transformer and/or the output filter 38 may be omitted.

As illustrated in FIG. 1, moreover, the system includes an output or motor snubber circuit 40, referred to herein as a first power dissipation circuit or a motor snubber. The power dissipation circuit 40 in certain embodiments is activated or enabled by a control signal 32 from the motor drive controller 30, although other implementations are possible in which the first power dissipation circuit 40 is actuated independent of the operation of the controller 30. Likewise, the illustrated controller 30 provides a control signal 34 to actuate the DC bus snubber circuit switch 16 to connect the dissipation resistor 18 across the DC bus, for example, according to the level of the DC bus voltage feedback signal or value 36, but other implementations are possible in which the DC bus snubber circuit 16, 18 is actuated independent of the controller 30. Moreover, a single controller 30 may be used to provide one or both of the control signals 32 and 34 as well is the inverter switching control signals 29, or separate controllers or circuits may be used for any or all of the signaling 29, 32, 34.

Although the system 2 of FIG. 1 receives a multiphase AC input from the source 4 and provides a multiphase AC output to drive the motor load 6, the various concepts of the present disclosure are not limited to three-phase implementations on either the input or the output, and other embodiments are possible in which a single phase motor loads 6 or other types of loads are driven by a single phase inverter output and/or other output configurations are possible having more than three phases. In addition, while the illustrated motor drive 10 includes an onboard rectifier 12 receiving AC input power from the source 4, other embodiments are possible in which the power conversion system receives DC power as an input, wherein the onboard rectifier 12 can be omitted.

The first power dissipation circuit (motor snubber) 40 can be any suitable circuitry by which one or more resistive load components can be selectively connected, directly or indirectly, to at least two of the AC output nodes carrying power between the inverter output 28 and the motor load 6. In the implementation of FIG. 1, for instance, the motor snubber 40 is connected to the three output lines between the filter 38 and the transformer 8. In other possible implementations, the snubber 40 can be connected between the inverter output 28 and the filter 38, or may instead be connected to the secondary side of the transformer 8. As mentioned above, moreover, one or more of the filter 38 and the transformer 8 may be omitted in certain embodiments, with the snubber 40 being directly or indirectly connected to the motor drive output 11.

Figure 2:
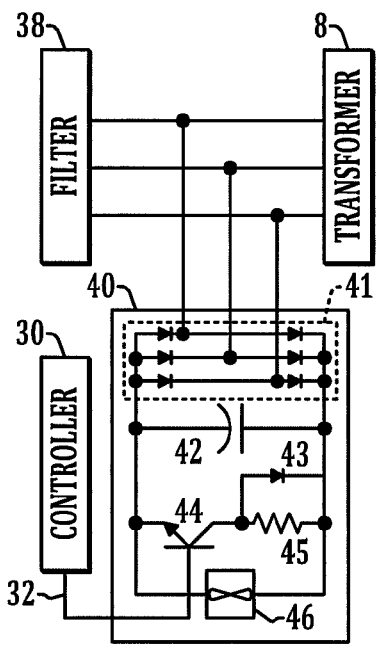
FIG. 2 is a schematic diagram illustrating an exemplary motor snubber power dissipation circuit connected between an output filter and a step up transformer, including a three-phase rectifier, an internal DC capacitor, a cooling fan, a switch controlled by a signal from the drive controller, and a load resistor for selective dissipation of regenerative power in certain embodiments of the system of FIG. 1.

One possible implementation of the motor snubber 40 is illustrated in FIG. 2, including a three-phase passive rectifier 41 connected to the three AC output lines, which rectifies the output power to provide a DC voltage across a capacitor 42. A transistor or other type of switching device 44 is connected in series with a load resistor 45 in parallel with the capacitor 42, and a diode 43 is connected with an anode at the node joining the switch 44 and the resistor 45 and a cathode connected to the positive DC node. In this embodiment, moreover, a fan 46 may be included, for example, to provide cooling to inductors of the filter 38 (FIG. 1), although the fan 46 may be omitted in certain implementations. In addition, this embodiment provides for external actuation or enablement of the motor snubber 40, by the controller 30 providing a control signal 32 to the base of the transistor 44. Other embodiments are possible in which different types of switching and control are used to activate the snubber 40, and the circuit 40 may alternatively be self-enabled, for example, using a crowbar circuit as shown in U.S. Pat. No. 7,479,756 to Kasunich, entitled "System and Method for Protecting a Motor Drive Unit from Motor Back EMF Under Fault Conditions", assigned to the assignee of the present disclosure, the entirety of which is hereby incorporated by reference.

Figure 3:
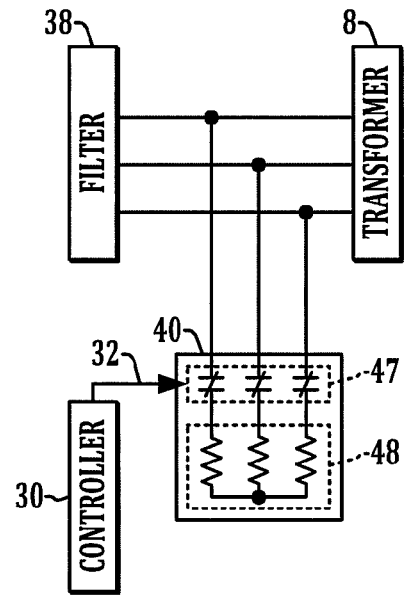
FIG. 3 is a schematic diagram showing another embodiment of the first power dissipation circuit including a three-phase contactor for selectively connecting load resistors to AC output lines of the system according to a signal from the motor drive controller.

FIG. 3 illustrates another possible embodiment of the motor snubber 40. In this case, a contactor 47 is used to selectively connect resistors 48 directly to the AC lines, with the controller 30 providing a control signal 32 in order to actuate the contactor 47. In this embodiment, moreover, the contacts 47 are preferably normally closed (NC) such that loss of power to the controller 30 will result in the contacts 47 being closed, thereby connecting the resistors 48 to the power converter output lines. Thus, in normal operation, the controller 30 may assert the signal 32 in a first state that energizes the contactor coil (not shown), thereby opening the contacts 47, and then change the state of the control signal 32, whether under active operation of the controller 30, or due to loss of power to the controller 30, to close the contacts 47. In this implementation, moreover, closure of the contacts 47 effectively connects the resistor elements 48 between the output lines, thereby providing a resistive load to dissipate energy regenerated by the connected motor load 6 back toward the inverter 20 (FIG. 1).

Figure 4:
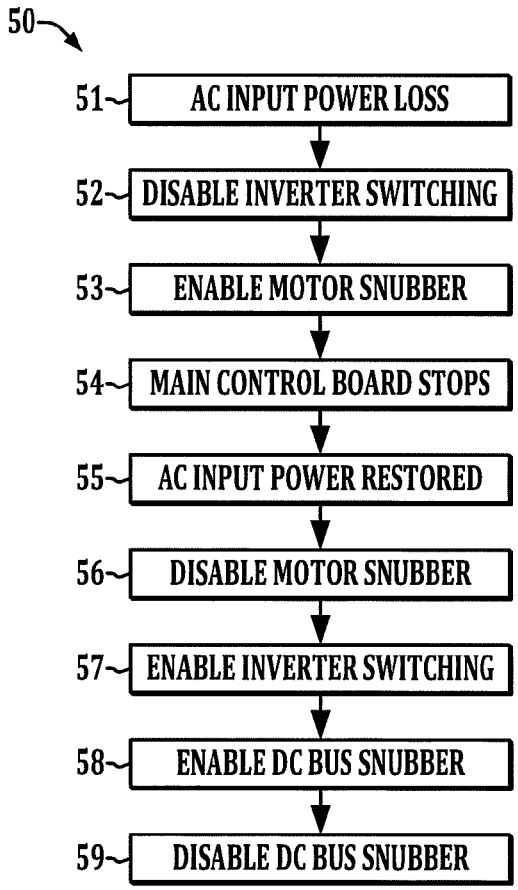
FIG. 4 is a flow diagram illustrating an exemplary process for limiting reverse rotation of the motor load and mitigating motor drive overvoltage for power loss events in the power conversion system of FIG. 1.
Figure 5:
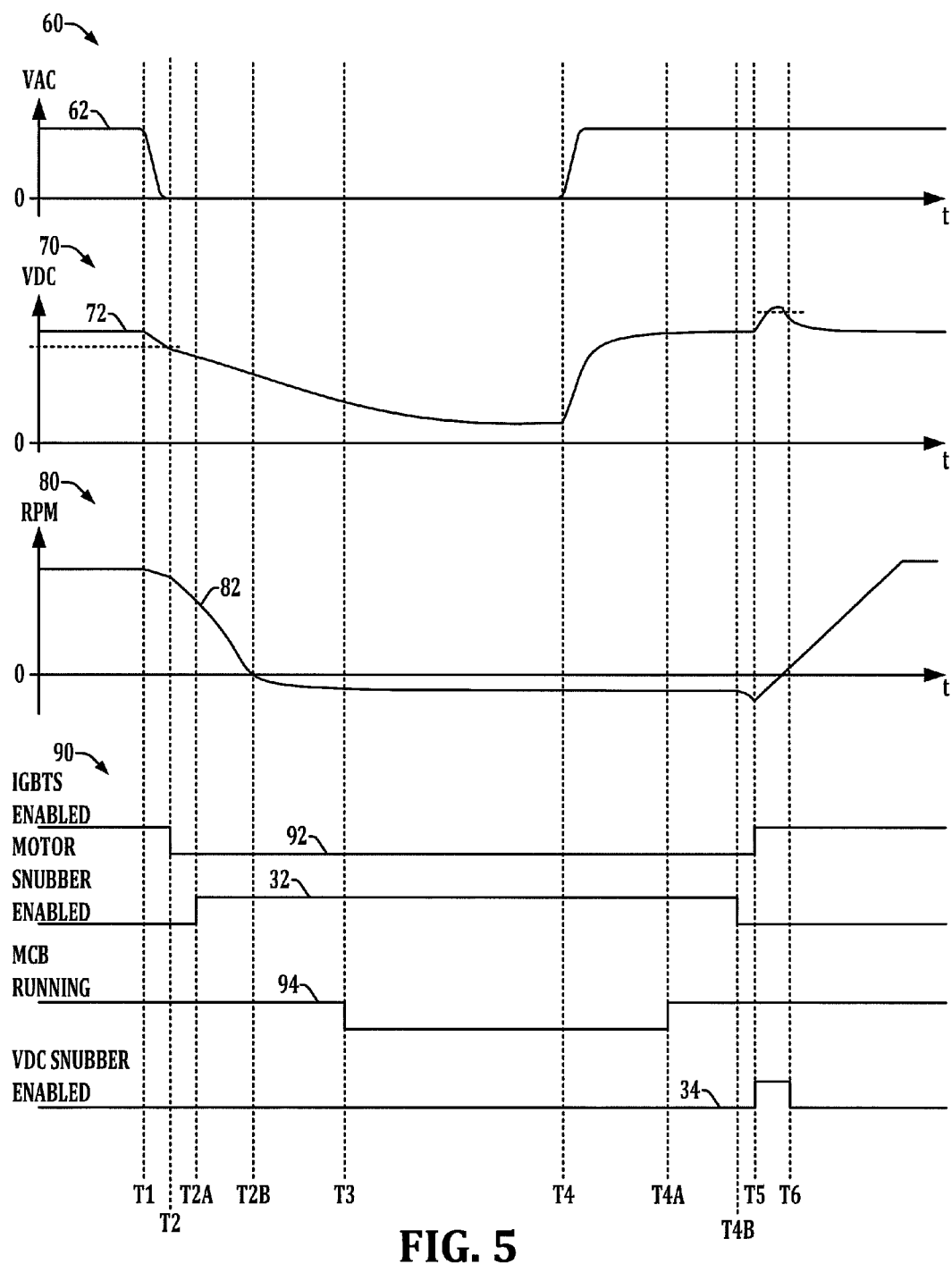
FIG. 5 is a signal and waveform diagram illustrating graphs of motor drive input power and DC bus voltages, motor speed, and various control signals and states in the power conversion system of FIG. 1.

Referring also to FIGS. 4 and 5, a process 50 is illustrated in FIG. 4 by which motor drive overvoltage conditions may be mitigated or avoided, and reverse rotation of the motor load 6 may be limited or otherwise controlled. As noted above, the activation or enablement of the motor snubber 40 operates to selectively connect a resistive load between the driven motor 6 and the output of the inverter 20. This is particularly advantageous in situations in which the motor drive 10 loses input power (e.g., the AC supply 4 becomes disconnected or otherwise inoperative). In such a situation, where the driven motor 6 is used in a submerged pumping application to extract fluid from a well, for example, loss of power can lead to motor stoppage followed by rotation in a reverse direction due to the pressure of previously pumped fluid draining back down the well. The inventors have appreciated that providing a load using the motor snubber 40 operates to inhibit reverse direction acceleration of the motor 6. Consequently, a certain amount of previously performed work by the pump motor 6 can be preserved by effectively slowing down the pump motor 6. Therefore, once power is restored to the system 2, less rework needs to be done in many cases. In addition, the connection of the motor snubber 40 can also mitigate the amount of back EMF and corresponding voltage levels at the motor 6 and also in the motor drive 10, thereby protecting these components from potential overvoltage degradation.

The process 50 in FIG. 4 illustrates one exemplary scenario in which the controller 30 and the power dissipation circuitry 16, 18, 40 operate to control the motor reverse rotation speed and also to mitigate overvoltage conditions in the motor drive 10 and at the motor 6. Reference is also made to the various signal and waveform diagrams illustrated in graphs 60, 70, 80 and 90 of FIG. 5. The process 50 is illustrated and described below in the form of a series of acts or events, although the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. In addition, not all illustrated steps may be required to implement a process or method in accordance with the present disclosure, and one or more such acts may be combined. The illustrated method 50 and other methods of the disclosure may be implemented in hardware, processor-executed software, or combinations thereof, such as in the exemplary controller 30, and may be embodied in the form of computer executable instructions stored in a tangible, non-transitory computer readable medium, such as in an electronic memory operatively associated with the controller 130 in one example.

At 51 in FIG. 4, the AC input power to the system 2 is lost. The power loss can be due to any cause, such as failure or disconnection of the AC input source 4 in FIG. 1 above. FIG. 5 illustrates a graph 60 showing an AC input voltage curve 62, where power is lost at time T1, and reaches zero before time T2 in the illustrated example. At 52 in FIG. 4, the controller 30 disables switching operation of the inverter 20, such as by discontinuing provision of the switching control signals 29 in FIG. 1. This is illustrated in the graph 90 of FIG. 5 by the low going transition in the "IGBTS ENABLED" signal 92. As further noted in the graph 70 of FIG. 5, loss of the AC input power begins a decrease in the DC voltage of the bus circuit 14, where FIG. 5 provides a graph 70 showing the DC bus voltage waveform 72 which begins decreasing at time T1 while the inverter switching devices 22-27 continue to operate. Thereafter at time T2, with the deactivation of the IGBT switching (control signal 92 going low in graph 90), the DC bus voltage decreases at a slower rate. FIG. 5 further provides a graph 80 showing a motor speed curve (RPM) 82, with the motor speed (in a forward direction) initially being at a steady state value, and decreasing after the power is interrupted at T1.

The controller 30 actuates the signal 32 at time T2A (FIG. 5) to enable the motor snubber 40 (53 in FIG. 4), by which the circuit 40 is placed in a first mode to selectively couple at least one resistive load between two or more of the AC output terminals to begin dissipation of power regenerated from the load 60 toward the motor drive 10. In the example of FIG. 2 above, actuation of the control signal 32 by the controller 30 turns on the transistor 44, thereby connecting the resistor 45 across the DC output of the rectifier 41 to dissipate regenerative power provided by the slowing and reversal of the motor 6. In the case of the contactor-based motor snubber 40 of FIG. 3, provision of the control signal 32 allows closure of the contacts 47 in a controlled manner under operation of the controller 30. Alternatively, the use of normally closed contacts in the contactor 47 will result in the contacts closing to connect the loading resistors 48 to the AC output nodes without further action by the controller 30 if the controller 30 ceases to operate. It is also noted that certain embodiments may employ motor snubber circuitry 40 that is self-enabling, in which case no control signal 32 need be provided by the controller 30 in order to enable the motor snubber 40 in response to loss of system input power.

In embodiments in which the controller 30 provides the control signal 32 to enable the motor snubber 40, moreover, the controller may disable the inverter switching (signal 92 in FIG. 5) and enable the motor snubber (via signal 32) contemporaneously, or may alternatively disable the IGBTs after enabling the motor snubber 40. However, the illustrated example (FIG. 5) advantageously disables operation of the inverter switches 22-27 at time T2 prior to enabling the motor snubber 40 at T2A, and the controller 30 may implement the timing of these signal transitions according to a predetermined time in certain embodiments. In other possible implementations, moreover, the controller 30 may gate the transitions of the signals 92, 32 according to one or more system operating conditions, such as a measured or estimated motor speed (82 in FIG. 5), a measured DC bus voltage (bus voltage 72 in FIG. 5, ascertained via feedback signal 36 in FIG. 1 above), etc. As seen in the graph 80 of FIG. 5, moreover, the motor speed continues to slow (in the forward direction) from time T2A until a time T2B at which the motor stops and ultimately reverses direction (RPM<0 in the figure). As seen in the graph 80, moreover, activation of the motor snubber 40 at time T2A advantageously reduces the amount of reverse direction acceleration in the motor speed 82, whereas the slope of the curve 82 in the reverse direction would continue at a steeper rate absent the use of the power dissipation circuit 40. Thus, the reverse motor speed is attenuated by operation of the snubber 40, thereby advantageously conserving the amount of previously pumped fluid in a deep well application, and also mitigating the amount of back EMF generated by the reverse rotation of the motor load 6. In this regard, it is noted that very lengthy power interruptions to the system 2 may indeed result in loss of all the previously pumped fluid in a given well, but the regulation or limiting of the reverse direction rotation of the motor load 6 nevertheless mitigates the level of back EMF regenerated by the motor 6, thereby protecting the motor 6 and/or the motor drive 10 and the components thereof.

At 54 in FIG. 4, the controller 30 (MCB or main control board) may stop normal operation at T3 in FIG. 5 (illustrated by the main control board running signal 94), for example, due to the input power loss. It is noted that the length of time during which input power is discontinued may dictate whether or not the controller 30 stops running.

At T4 in FIG. 5, the AC input power is restored (55 in FIG. 4), as seen in the graph 60 with the increase in the AC voltage 62 and the corresponding increase in the DC bus voltage 72 (graph 70). Since the inverter 20 remains inoperative and the motor snubber 40 remains activated at this point, the reverse motor speed (82 in FIG. 5) continues as before. At some point (T4A in FIG. 5), the main control board (controller 30) begins running (indicated as a rising edge in the signal 94 in FIG. 5), and the controller 30 disables the motor snubber via signal 32 at time T4B (56 in FIG. 4). In addition, the controller resumes switching operation of the inverter 20 at 57 in FIG. 4 (T5 in FIG. 5) and enables the DC bus snubber circuit 16, 18 via control signal 34 (58 in FIG. 4). As seen in FIG. 5, the IGBTs 22-27 may be enabled at roughly the same time as the DC bus snubber circuit is activated via signal 34, although not a strict requirement of all the possible implementations of the concepts of the present disclosure. Moreover, while the illustrated example provides for deactivation of the motor snubber 40 at time T4B prior to activation of the DC bus snubber 16, 18 and the inverter 20 at T5, these actions may be taken contemporaneously or different sequences can be used in various implementations.

In the illustrated example, deactivation of the motor snubber 40 initially causes the reverse rotation of the motor 62 increase (acceleration downward in the RPM curve 82 of FIG. 5), and this trend is reversed when the switching operation of the inverter 20 is resumed at T5. Thereafter, the reversed motor slows and eventually stops, and subsequently begins rotating in the forward direction. As further seen in FIG. 5, moreover, resumption of the IGBT operation at T5 increases the DC bus voltage 72, and the DC snubber 16, 18 operates to mitigate the amount of excess DC bus voltage, thereby preventing or mitigating degradation of the DC bus capacitor C and other components of the motor drive 10. At T6 in FIG. 5, moreover, the DC bus snubber circuit 16, 18 is deactivated (59 in FIG. 4), and the system 2 resumes normal operation thereafter. As noted above, the controller 30 in certain embodiments may employ the DC bus snubber 16, 18 based at least in part on the feedback signal or value 36 indicating the DC bus voltage level. For example, the circuit 16, 18 may be activated in one implementation based on an increase of the DC bus voltage (72 in FIG. 5) above a first threshold value. In certain embodiments, moreover, the controller 30 may release or deactivate the snubber circuitry 16, 18 once the DC bus voltage 72 thereafter decreases below the same or a second threshold value. In one possible implementation, moreover, the controller 30 may provide a pulse width modulated control signal 34 for closing the DC bus snubber switch 16, for example, with a pulse width of the control signal 34 being controlled according to the amount of excess DC bus voltage beyond the threshold value. In other possible implementations, the activation and deactivation of the DC bus voltage snubber circuit 16, 18 may be implemented by separate circuitry, or may be self-activated without use of any control signal 34 from the controller 30.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
   an AC output including a plurality of AC output terminals;
   a DC bus circuit comprising first and second DC bus nodes and at least one DC bus capacitance connected between the first and second DC bus nodes;
   an inverter comprising a DC input with first and second DC input nodes connected to the first and second DC bus nodes, an inverter output with a plurality of inverter output nodes, and a plurality of inverter switching devices individually coupled between one of the DC input nodes and one of the inverter output nodes, the inverter switching devices individually operative to selectively electrically couple the corresponding DC input node with the corresponding inverter output node according to a corresponding inverter switching control signal;
   at least one controller operative to provide the inverter switching control signals to cause the inverter to selectively convert DC power from the DC bus circuit to provide AC electrical power to the inverter output;
   a first power dissipation circuit coupled with the AC output and operative in a first mode to selectively couple at least one resistive load between at least two of the AC output terminals to dissipate power provided to the system from a load; and
   a second power dissipation circuit operative in a first mode to selectively dissipate power in the DC bus circuit;
   wherein the at least one controller is operative in response to loss of system input power to provide a first control signal to place the first power dissipation circuit in the first mode to dissipate power provided to the AC output from the load.

2. The power conversion system of claim 1, wherein the at least one controller is operative in response to loss of system input power to disable operation of the inverter by discontinuing provision of the inverter switching control signals prior to placing the first power dissipation circuit in the first mode.

3. The power conversion system of claim 2, wherein the at least one controller is operative in response to resumption of system input power to:
   take the first power dissipation circuit out of the first mode to discontinue dissipation of power provided to the AC output from the load; and
   provide a second control signal to place the second power dissipation circuit in the first mode to selectively dissipate power in the DC bus circuit.

4. The power conversion system of claim 3, wherein the at least one controller is operative in response to resumption of system input power to enable operation of the inverter by resuming provision of the inverter switching control signals after taking the first power dissipation circuit out of the first mode.

5. The power conversion system of claim 4, wherein the at least one controller is operative to disable the second power dissipation circuit to discontinue dissipation of power in the DC bus circuit after enabling operation of the inverter.

6. The power conversion system of claim 1, further comprising an output filter connected between the inverter output and the AC output, wherein the first power dissipation circuit is connected to at least two of the AC output terminals of the AC output.

7. The power conversion system of claim 1, wherein the first power dissipation circuit comprises:
   a rectifier coupled to at least two of the AC output terminals of the AC output and operative to provide a DC output voltage;
   a switch; and
   at least one resistor connected with the switch in a series circuit across the DC output voltage of the rectifier to dissipate power provided to the system from the load when the switch is on.

8. The power conversion system of claim 7, wherein the switch of the first power dissipation circuit is controlled by the at least one controller.

9. The power conversion system of claim 1, wherein the first power dissipation circuit comprises:
   at least one switch with a first terminal connected to one of the AC output terminals of the AC output and a second terminal; and
   at least one resistor with a first terminal connected to the second terminal of the at least one switch and a second terminal coupled to another one of the AC output terminals to dissipate power provided to the system from the load when the at least one switch is on.

10. The power conversion system of claim 9, wherein the at least one switch of the first power dissipation circuit is controlled by the at least one controller.

11. A method for mitigating motor drive overvoltage and limiting the reverse rotation of a motor load for motor drive power loss events, the method comprising:
    selectively disabling operation of a motor drive output inverter in response to loss of motor drive system input power;
    selectively coupling a first resistive load circuit to at least two AC nodes between the motor drive output inverter and the motor load in response to loss of the motor drive system input power to limit reverse rotation of the motor load by dissipating power provided to the motor drive from the motor load;
    selectively disabling the first resistive load circuit to discontinue dissipation of power provided to the motor drive from the motor load after restoration of motor drive system input power;
    selectively enabling operation of the motor drive output inverter after restoration of motor drive system input power to drive the motor load to resume rotation in a forward direction;
    selectively connecting a second resistive load to dissipate power in a DC bus circuit of the motor drive after restoration of motor drive system input power; and
    thereafter disconnecting the second resistive load to discontinue dissipation of power in the DC bus circuit to resume normal motor drive operation;
    wherein selectively coupling the first resistive load circuit to the at least two AC nodes includes providing a first control signal in a first state from a motor drive controller to at least one switch of the first resistive load circuit in response to loss of the motor drive system input power; and
    wherein selectively disabling the first resistive load circuit includes providing the first control signal in a second state from the motor drive controller to the at least one switch of the first resistive load circuit after restoration of motor drive system input power.

12. The method of claim 11:
wherein selectively connecting the second resistive load to dissipate power in the DC bus circuit of the motor drive includes providing a second control signal in a first state from the motor drive controller to a switch in the DC bus circuit after restoration of motor drive system input power; and
wherein disconnecting the second resistive load includes providing the second control signal in a second state from the motor drive controller to the switch and in the DC bus circuit.

13. The method of claim 12, wherein operation of the motor drive output inverter is disabled prior to selectively connecting the first resistive load circuit to the at least two AC nodes.

14. The method of claim 11, wherein operation of the motor drive output inverter is disabled prior to selectively connecting the first resistive load circuit to the at least two AC nodes.

15. A non-transitory computer readable medium with computer executable instructions for mitigating motor drive overvoltage and limiting the reverse rotation of a motor load for motor drive power loss events, the computer readable medium having computer executable instructions for:
selectively disabling operation of a motor drive output inverter in response to loss of motor drive system input power;
selectively coupling a first resistive load circuit to at least two AC nodes between the motor drive output inverter and the motor load in response to loss of the motor drive system input power to limit reverse rotation of the motor load by dissipating power provided to the motor drive from the motor load;
selectively disabling the first resistive load circuit to discontinue dissipation of power provided to the motor drive from the motor load after restoration of motor drive system input power;
selectively enabling operation of the motor drive output inverter after restoration of motor drive system input power to drive the motor load to resume rotation in a forward direction;
selectively connecting a second resistive load to dissipate power in a DC bus circuit of the motor drive after restoration of motor drive system input power; and
thereafter disconnecting the second resistive load to discontinue dissipation of power in the DC bus circuit to resume normal motor drive operation;
wherein operation of the motor drive output inverter is disabled prior to selectively connecting the first resistive load circuit to the at least two AC nodes.

16. The non-transitory computer readable medium of claim 15, comprising computer executable instructions for:
selectively coupling the first resistive load circuit to the at least two AC nodes by providing a first control signal in a first state from a motor drive controller to at least one switch of the first resistive load circuit in response to loss of the motor drive system input power; and
selectively disabling the first resistive load circuit by providing the first control signal in a second state from the motor drive controller to the at least one switch of the first resistive load circuit after restoration of motor drive system input power.

17. The non-transitory computer readable medium of claim 16, comprising computer executable instructions for:
selectively connecting the second resistive load to dissipate power in the DC bus circuit of the motor drive by providing a second control signal in a first state from the motor drive controller to a switch in the DC bus circuit after restoration of motor drive system input power; and
disconnecting the second resistive load by providing the second control signal in a second state from the motor drive controller to the switch and in the DC bus circuit.

18. The non-transitory computer readable medium of claim 16, comprising computer executable instructions for disabling operation of the motor drive output inverter prior to selectively connecting the first resistive load circuit to the at least two AC nodes.

19. The non-transitory computer readable medium of claim 15, comprising computer executable instructions for:
selectively connecting the second resistive load to dissipate power in the DC bus circuit of the motor drive by providing a second control signal in a first state from the motor drive controller to a switch in the DC bus circuit after restoration of motor drive system input power; and
disconnecting the second resistive load by providing the second control signal in a second state from the motor drive controller to the switch and in the DC bus circuit.

20. The non-transitory computer readable medium of claim 15, comprising computer executable instructions for disabling operation of the motor drive output inverter prior to selectively connecting the first resistive load circuit to the at least two AC nodes.

* * * * *